UNITED STATES PATENT OFFICE.

JOSEPH OTTO LUTHY, OF SAN ANTONIO, TEXAS, ASSIGNOR OF ONE-HALF TO YALE HICKS, OF SAN ANTONIO, TEXAS.

STORAGE BATTERY.

1,161,398.     Specification of Letters Patent.     Patented Nov. 23, 1915.

No Drawing.     Application filed February 26, 1913. Serial No. 750,778.

*To all whom it may concern:*

Be it known that I, JOSEPH OTTO LUTHY, a citizen of the Republic of Switzerland, residing at San Antonio, in the county of Bexar and State of Texas, have invented certain new and useful Improvements in Storage Batteries, of which the following is a specification.

This invention relates to electric accumulators or storage batteries, and particularly to the active materials and electrolyte of the cells.

The object of the invention is to provide a storage battery of high efficiency and of long life by the use of an active material and electrolyte which will secure these results.

It is well known that an efficient and economical storage battery can only be obtained when the electrodes or battery elements possess in the highest degree the capacity of storing oxygen and hydrogen, and when they are capable of resisting to the greatest extent the influence of external mechanical effects as well as the internal molecular action which takes place under the chemical conversions or changes that occur in the charging and discharging.

After many years of experimenting with secondary batteries, I have found that by adding a small per cent. of silver chlorid to any solution used in forming metallic salts or oxids into the active paste or material, composing the electrodes of such batteries, and also in the electrolyte used in the cells after the plates or elements have been formed, that such cells will not decrease in efficiency as rapidly as other batteries and will also have a longer life and will be more constant and unvariable.

Elements or electrodes in which the above substance or chemicals were used and which have given excellent results were constructed in the following manner: Supporting and conducting lead grids of the Faure (pasted) type are immersed for about 30 minutes in a solution of water 60% and nitric acid 40%. The grids are taken from this solution and washed in running water to remove all traces of nitric acid, after which they are placed in a solution of magnesium sulfate, electrically connected as they would be in a battery. An electric current of medium strength is then sent through these grids for a period of about three hours, after which they are washed and kept in water until they are ready for filling.

The active material for the positive elements consists of lead peroxid, pulverized pumice stone, and carbon mixed with a solution of water, 70%, sulfuric acid, 25%, sodium silicate 4%, and silver chlorid 1%.

The active materials for the negative elements consist of lead oxid, pulverized pumice stone, mixed with a solution of water, 60%, sulfuric acid, 35%, sodium silicate, 4%, and silver chlorid, 1%.

What I claim is:

1. A secondary battery containing as part of the electrolyte a relatively small percentage of a silver salt in solution.

2. A secondary battery containing as part of the electrolyte approximately one per cent. of silver salt in solution.

3. A secondary battery containing as part of the electrolyte approximately one per cent. of silver chlorid in solution.

In witness whereof I affix my signature in presence of two witnesses.

JOSEPH OTTO LUTHY.

Witnesses:
E. P. BUNYA,
BENNETT S. JONES.

Copies of this patent may be obtained for five cents each, by addressing the "Commissioner of Patents, Washington, D. C."